Patented Dec. 5, 1922.

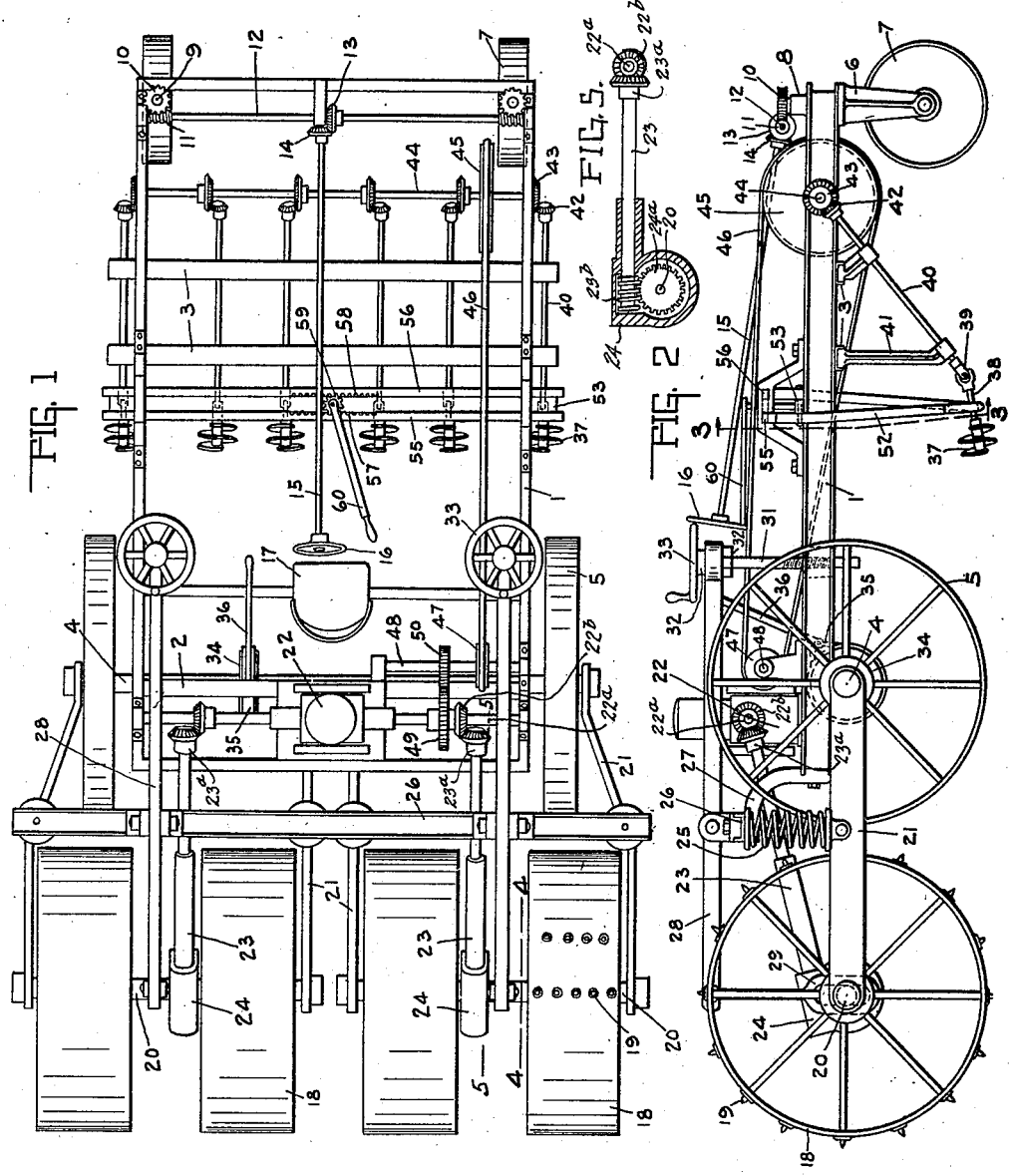

1,438,035

UNITED STATES PATENT OFFICE.

HARLEN W. GOUGH, OF ALBANY, INDIANA.

TRACTOR.

Application filed August 16, 1919. Serial No. 318,023.

*To all whom it may concern:*

Be it known that I, HARLEN W. GOUGH, a citizen of the United States, and a resident of Albany, county of Delaware, and State of Indiana, have invented a certain new and useful Tractor; and I do hereby declare that the following is a full, clear, and exact description thereof, reference being had to the accompanying drawings, in which like numerals refer to like parts.

This invention relates to tractors, preferably of the universal type. The paramount feature of this invention is to apply the power to the cultivating wheels, whereby they, through the agitation of the soil will create a force that is available for traction. There is no residue of latent power from any other source, but all power must be derived from the act of cultivation.

This is accomplished by applying the power so that it causes the simultaneous cultivation of the soil, and the propulsion of the tractor through the instrumentality of the cultivating means. In carrying out this feature of the invention the tractor is provided with wheels for supporting the tractor, and provided with power driven wheels so as to both propel the tractor, and cultivate the soil when power is applied to rotate said wheels. When the power driven wheels are rotated they are enabled to dig up, agitate and cultivate the soil, and also push forward and propel the tractor by means of the peripheral speed thereof, which is greater than that of the supporting wheels and movement of the tractor, which increased rotation and skidding effect causes the projections or the like on said wheels to agitate and cultivate the soil. Therefore, the speed of rotation of the power driven wheels must be greater than the speed of travel of the tractor so that said wheels can both cultivate the soil and propel the tractor.

A further feature of the invention is the provision of rotating cultivating attachments for cross cultivating the soil laterally between the growing plants as well as longitudinally between the rows of plants followed by the tractor, suitable means being provided for controlling the lateral movement of said cultivating attachments. In addition to cultivating the soil these cultivating attachments also rotate faster than the travel of the tractor so that such rotation will assist in propelling the tractor.

A further feature of the invention is the provision of means for controlling the action and operation of the various cultivating parts of the tractor, and for controlling the speed of the travel of the tractor, whereby when the tractor is traveling down grade the speed thereof will not attain the speed of rotation of the cultivating parts, this also causing said cultivating parts to have a spinning or cultivating action in addition to propelling the tractor.

A further important feature of the invention is in constructing the combined cultivating and driving mechanism that the weight of the material employed in constructing the parts of the tractor may be greatly reduced without in any manner detracting from the full strength of such parts.

In the accompanying drawings, which are made a part of this application, Fig. 1 is a top plan view of a tractor. Fig. 2 is a side elevation thereof. Fig. 3 is a detail sectional view as seen on line 3—3 Fig. 2 and Fig. 4 is a detail sectional view as seen on line 4—4 Fig. 1. Fig. 5 is a sectional view along line 5—5 in Fig. 1, showing one of the means for actuating the cultivators.

Referring to the drawings, in which similar reference numerals designate corresponding parts throughout the several views, 1 indicates a frame which is preferably constructed of channel iron and is rectangular in general outline, said frame having cross bars 2 and 3 between its ends for purposes to be hereinafter more fully set forth.

Extending transversely below the rear end portion of the frame 1 is an axle 4 mounted in suitable bearings, (not shown) on the frame 1, supporting wheels 5 being mounted upon the ends of said axle and rotatable therewith.

Mounted in yokes 6 at the forward end of the frame 1, are guide wheels 7, said yokes being rotatable in their bearings 8 so that said wheels may be readily rotated for guiding the cultivator. Each yoke is provided with a stem 9 which projects through the bearing 8 cooperating therewith and has a worm gear 10 attached to the upper end thereof with which cooperates a worm mounted upon a shaft 12 extending transversely of the cultivator, said shaft having a bevel gear 13 thereon with which meshes a bevel gear 14 on the steering rod 15, said rod projecting rearwardly of the tractor and having a hand wheel 16, whereby the operator on the seat 17 may readily control and guide the tractor. In the rear of the supporting wheels 5 and the frame 1 are power driven cultivating wheel 18 which pass between the rows of growing plants and are provided with projections 19 which serve to agitate the surface of the soil and loosen the same as the wheels pass thereover, and also serve for propelling the tractor, the projections providing a more or less traction drive.

Normally, these wheels 18 are in reality idler wheels, in that they receive no weight thereon from the tractor proper and consequently are more or less free to be driven at a rate of speed greater than the speed of travel of the tractor, consequently the members 19 will dig up the soil as they pass thereover.

The wheels 18 are mounted upon axles 20, which axles are connected with the axle 4 by means of straps 21, one at each end of the axles. The cultivating wheels may be connected to the axles 20 by any suitable form of clutch mechanism (not shown) whereby when turning the tractor, some of the cultivating wheels may drive forwardly while the others will ratchet on the axles 20, thus permitting the tractor to be turned in less space.

The cultivator wheels 18 are driven from an engine 22 mounted upon the frame 1 (see Figs. 1 and 2) through the medium of the shaft $22^a$ which carries a bevel gear $22^b$. Meshing with the bevel gear $22^b$ is a bevel gear $23^a$ and carried upon one end of the shaft 23. The shaft 23 extends into a housing 24 (see Fig. 5) and carries upon its enclosed end a worm $23^b$, which worm meshes with a worm gear $24^a$ carried by the shaft 20, whereby rotational movement from the engine is transmitted to the shaft 20 to rotate the cultivating wheels 18. This construction, or the equivalent thereof, permits vertical swinging movement of the wheels 18 with respect to the frame without effecting the operation of the driving mechanism.

The cultivating wheels 18 are normally held in engagement with the soil over which the tractor is passing, through the medium of tension springs 25, the lower ends of which are attached to the straps 21 while the upper ends thereof are attached to a cross bar 26 carried by the brackets 27 extending upwardly from the frame 1. The cultivating wheels under ordinary circumstances freely move upwardly or downwardly, the degree of movement being controlled by the springs 25, or said wheels may be positively lowered so as to assume the weight of the rear portion of the tractor to lift it entirely out of engagement with the soil, by levers 28 which are pivoted between their ends to the cross bar 26. The rear ends of the levers have links 29 pivoted thereto, the lower ends of which are provided with elongated slots 30 through which the axles 20 extend, said slots being so arranged as not to interfere with the ordinary movement of the axle, but when the inner ends of the levers 28 are elevated, the upper ends of the slots 30 are contacted with the axles 20 and move the same downwardly, while on the other hand, when the inner ends of the levers 28 are depressed, or lowered, the lower ends of the slots 30 will engage the axles 20 and lift the axles and cultivating wheels upwardly out of engagement with the soil. The levers 28 are operated in any suitable manner, as by means of shafts 31, the lower ends of which are threaded and engaged with parts of the frame 1 so that when the shafts are rotated, they will be moved longitudinally upwardly or downwardly. The shafts pass through the ends of the levers 28, and by placing collars 32 on opposite sides of the ends of the levers said ends will be raised or lowered with the shafts 31. For conveniently operating the shafts 31, hand wheels 33 are attached to the upper ends of the shafts.

In order to regulate the travel of the tractor, as when going down grade, a brake drum 34 is attached to the axle 4, and any preferred form of brake band 35 is connected with the brake drum so that by properly manipulating the brake lever 36 the brake band may be tightened around the drum and the rotation of the axle 4, and wheels 5 secured thereto, retarded.

It will be understood, of course, that the cultivating wheels 18 may be used for many purposes other than cultivating growing plants, as for instance they may be used as a surface scarifier and roller on roadways, and if desired, the rims of the wheels 18 may be made demountable so that the rims may be interchangeable for adapting the wheels for various uses.

Furthermore the frame 1 may be so elevated as to throw the entire weight of the rear end of the tractor on to the cultivating wheels 18, by lowering the wheels 18 until the supporting wheels 5 are disengaged from the ground.

Any suitable cultivating attachment may be employed in connection with the tractor, but the form shown in the drawings is preferable, and in this instance a plurality of spirally arranged blades 37 is provided, each being mounted upon a stub shaft 38, which stub shaft is connected by a universal joint 39 to a driving shaft 40, depending from the cross bars 3, and is driven by attaching a bevel gear 42 to one end of the shaft 40 which meshes with the bevel gear 43 on a shaft 44. The shaft 44 is rotatably mounted in the frame 1 and has attached thereto a belt wheel 45, power being transmitted thereto through the medium of a belt 46. The belt 46 is extended rearwardly and around a pulley 47 carried by a laterally extending shaft 48, the inner end of the shaft 48 being connected with the engine 22 through the medium of the meshing gears 49 and 50.

The spirally arranged blades 37 are arranged in pairs and in the present instance three pairs are shown, which will cultivate three rows of the growing plants at the same time, one blade of one pair passing to one side of the growing plant and the other blade of the same pair to the opposite side of the growing plants.

When the cultivating blades are used for cultivating corn, which is usually planted in hills, so that the stalks will be in rows in both directions or checked, the blades are arranged to be moved laterally so as to cultivate between the stalks of corn as well as between the rows of corn, that is to say, the pairs of cultivating blades are moved towards each other to pass between the stalks of corn or separated to pass by the stalks of corn. To this end the stub shafts 38 pass through elongated slots 51 of hangers 52, the said hangers adjacent their upper ends being provided with a cross bar 53 attached to the frame 1, the hanger for one stub shaft of one set passing in the rear of the cross bar 53 while the hanger for the other stub shaft 37 of the pair passes to the opposite side of the cross bar 53, the upper end of the first hanger engaging with a recess 54 of a rack bar 55, while the upper end of the second hanger engages a similar recess in a rack bar 56. The bars 55 and 56 are provided with racks 57 and 58 respectively which engage with a pinion 59, so that when said pinion is rotated, which is accomplished through the medium of a hand lever 60, the bar 55 will be moved lengthwise in one direction and the bar 56 in the opposite direction. Consequently the pairs of spirally arranged blades 37 will be moved towards each other, and may be moved a sufficient distance to come practically together, and consequently will pass between the stalks of growing plants in adjacent hills of the same row. Likewise when the pinion is rotated in the opposite direction the cultivating blades will be separated so that they will cultivate between adjacent rows and as well as pass by the plants without injuring the same.

The pairs of spirally arranged blades are, as is the case with the cultivating wheels, caused to rotate at a greater speed than the speed of travel of the tractor, consequently the cultivating blades will assist in driving the tractor as well as cultivate the soil. Although no means is shown for raising the cultivating blades out of engagement with the soil, it will be readily understood that any suitable means may be provided for this purpose.

By arranging the tractor substantially in the manner herein shown, the operation of the parts thereof will be greatly facilitated, and at the same time the weight thereof maintained at a minimum over the form of tractor to which the ordinary cultivator attachments are secured. Furthermore by placing the cultivating wheels in the rear of the tractor as shown the tilting action prevalent in the ordinary make of tractor, is entirely overcome.

The invention claimed is:

A tractor including non-propelling wheels for supporting the weight of said tractor, non-weight receiving cultivating wheels attached to said tractor, means for rotating said cultivating wheels for simultaneously cultivating the soil and propelling the tractor, and means for retarding the rotation of said non-propelling wheels when desired whereby said tractor will cultivate when going down hill.

In witness whereof, I have hereunto affixed my signature.

HARLEN W. GOUGH.